United States Patent
Goutenoire et al.

(10) Patent No.: US 7,018,566 B2
(45) Date of Patent: Mar. 28, 2006

(54) COMPOUNDS DERIVED FROM $L_{A2}MO_2O_9$ AND THEIR USE AS IONIC CONDUCTORS

(75) Inventors: François Goutenoire, Le Mans (FR); Philippe Lacorre, Etival-les-Le Mans (FR)

(73) Assignee: Centre National de la Recherche Scientifique, Paris (FR)

( * ) Notice: Subject to any disclaimer, the term of this patent is extended or adjusted under 35 U.S.C. 154(b) by 314 days.

(21) Appl. No.: 10/240,835

(22) PCT Filed: Apr. 5, 2001

(86) PCT No.: PCT/FR01/01029

§ 371 (c)(1),
(2), (4) Date: Mar. 24, 2003

(87) PCT Pub. No.: WO01/77022

PCT Pub. Date: Oct. 18, 2001

(65) Prior Publication Data

US 2003/0160216 A1    Aug. 28, 2003

(30) Foreign Application Priority Data

Apr. 7, 2000    (FR) .................................. 00 04488

(51) Int. Cl.
    *H01B 1/08*    (2006.01)
    *H01M 8/24*    (2006.01)
    *C04B 35/00*    (2006.01)

(52) U.S. Cl. ................ 252/500; 252/518.1; 252/520.2; 252/521.1; 252/521.2; 429/12; 423/606; 501/46

(58) Field of Classification Search ................ 252/518, 252/520, 521, 500, 518.1, 202.2, 521.1, 521.2; 429/12; 423/606; 501/46

See application file for complete search history.

(56) References Cited

U.S. PATENT DOCUMENTS 4,970,027 A * 11/1990 Honda et al. .......... 225/520.21
5,723,074 A    3/1998 Balachandran et al. ..... 252/519
6,514,314 B1 * 2/2003 Sirman et al. ................. 95/54

FOREIGN PATENT DOCUMENTS

DE    198 07 269    8/1999
EP    0 663 231    7/1995
JP    07237968    9/1995
WO    WO 99/21649    5/1999

OTHER PUBLICATIONS

Lacorre et al, "First Direct Synthesis by High Energy Ball Milling of a New Lanthanum Molybdate", J. Solid. State. Chem. 1997, 132, pp 443-446.*
Kuang et al, "UltrafineLa-Mo and Ce-Mo complex oxide particle catalysts for selective oxidation of toluene", J. Mater. Chem., 1998, 8(1), pp 19-20.*
Lacorre et al, "Designing fast oxide-ion conductors based on La2Mo2O9", Nature 2000, 404, pp 856-858.*
Goodenough, "Oxide-ion conductors by design", Nature, 404, pp 821-822.*
International Search Report.

* cited by examiner

*Primary Examiner*—Mark Kopec
*Assistant Examiner*—Kallambella Vijayakumar
(74) *Attorney, Agent, or Firm*—Buchanan Ingersoll PC

(57) ABSTRACT

The invention concerns novel compounds derived from $La_2Mo_2O_9$ and their use as ion conductors.

The compounds of the invention have formula (1):

$$A_{2-x}A'_xB_{2-y}B'_yO_{9-z+\delta}X_z$$

in which A is at least one trivalent element selected from trivalent rare earths, trivalent bismuth, trivalent antimony and trivalent arsenic; A' is at least one monovalent element selected from alkalis; or a divalent element selected from alkaline-earths, tin, lead, samarium, europium, erbium, thulium and ytterbium; or a quadrivalent element selected from thorium, uranium, group IVA elements, cerium, praseodymium and terbium; B is at least one hexavalent element from groups VIA, VIIA, VIII and group VIB with the exception of oxygen; B' is at least one element selected from lithium, sodium, magnesium, calcium, scandium, yttrium, rare earths with atomic numbers 63 to 71, elements from groups IVA to IIB with an oxidation number of less than 6, aluminium III, silicon IV, gallium III, germanium IV, indium III, tin IV, phosphorus V, antimony V and bismuth V; X is selected from sulphur, fluorine and chlorine; where $0 \leq x < 2$; $0 \leq y < 2$; $0 \leq z \leq 3$; and with the condition that when A is lanthanum and B is tungsten or molybdenum, at least one of x, y or z is different from 0; the compounds having a cationic cubic or pseudo-cubic $\beta$-$SnWO_4$ type lattice.

14 Claims, No Drawings

COMPOUNDS DERIVED FROM $L_{A2}MO_2O_9$ AND THEIR USE AS IONIC CONDUCTORS

This application is an application under 35 U.S.C. Section 371 of International Application Number PCT/FR01/01029 filed on Apr. 05, 2001.

The invention relates to novel compounds derived from $La_2Mo_2O_9$ and to their use as ion conductors.

Ion conductors can be used in a number of applications. Fuel cells constitute an area of burgeoning development that can be cited. Thus, there is a need for materials of that type. Further, in the particular case of fuel cells, existing cells function at high temperatures of at least 900° C. At these temperatures, reduction and cationic diffusion phenomena in the different elements of the cell introduce chemical reactions at the interfaces followed by a degradation of electrical performance. Thus, the search is on for conductive materials that can reduce the operational temperatures of said cells and thus for products with sufficient conductivity at lower temperatures.

The invention aims to provide compounds that satisfy said needs.

To this end, the compounds of the invention are characterized in that they have formula (1):

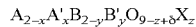

in which:
A is at least one trivalent element selected from trivalent rare earths, trivalent bismuth, trivalent antimony and trivalent arsenic;
A' is at least one element selected from:
  monovalent alkali elements;
  divalent elements from the group comprising alkaline-earths, tin, lead, samarium, europium, erbium, thulium and ytterbium;
  quadrivalent elements from the group comprising thorium, uranium, group IVA elements, cerium, praseodymium and terbium;
B is at least one hexavalent element selected from groups VIA, VIIA, VIII and group VIB with the exception of oxygen;
B' is at least one element selected from lithium, sodium, magnesium, calcium, scandium, yttrium, rare earths with atomic numbers of 63 to 71, elements from groups IVA to IIB with an oxidation number of less than 6, aluminium III, silicon IV, gallium III, germanium IV, indium III, tin IV, phosphorus V, antimony V and bismuth V;
X is at least one anion selected from sulphur, fluorine and chlorine;
x, y and z satisfy the following equations:

$0 \leq x < 2; 0 \leq y < 2; 0 \leq z \leq 3$ and with the condition that when A is lanthanum and B is tungsten or molybdenum, at least one of x, y or z is different from 0;

the compounds having a cubic or pseudo-cubic cationic $\beta$-$SnWO_4$ type lattice.

Further characteristics, details and advantages of the invention will become clear from the following description and non limiting examples intended to, illustrate the invention.

A first characteristic of the compounds of the invention is that they have a cubic or pseudo-cubic cationic $\beta$-$SnWO_4$ type lattice. The cubic or pseudo-cubic cationic $\beta$-$SnWO_4$ type lattice can have superlattices that are commensurable (multiplication of the parameters a, b, c by a whole number) or incommensurable with the cubic or pseudo-cubic lattice. The term "pseudo-cubic" means that the cubic lattice can be more or less distorted. In general, this distortion of the lattice structure corresponds to a variation of at most 1% for each of the parameters a, b, c and $\alpha$, $\beta$, $\gamma$ compared with the value of these same parameters for the cubic structure. More particularly, this variation can be at most 0.5%, still more particularly at most 0.2%.

The structure type is determined by high resolution X-ray diffraction at ambient temperature (20±5° C.) using a Bruker-AKS D8 $\theta$-2 $\theta$ ($CuK\alpha_1 + K\alpha_2$) diffractometer. At a temperature above or below ambient temperature, it is possible for the compounds of the invention to have a different structure.

The different constituent elements of the compounds of the invention will now be described in more detail.

The periodic table referred to in the description is that published in the Supplément au Bulletin de la Société Chimique de France n° 1 (January 1966). Further, the term "rare earth" means an element from the group constituted by yttrium and elements from the periodic table with atomic numbers in the range 57 to 71 inclusive.

It should be noted here that the invention is also applicable to the case in which in formula (1) A and/or B are combinations of two or more elements selected from those given in the above definitions for A and B. In such a case, any respective proportions of the elements in such combinations are possible.

A is at least one trivalent element selected from trivalent rare earths, trivalent bismuth, trivalent antimony and trivalent arsenic. More particularly, the rare earth can be selected from the group comprising lanthanum, cerium, praseodymium, neodymium, samarium, europium and gadolinium. In a variation of the invention, this rare earth can be lanthanum, neodymium or a combination of the two.

In a further variation, element A can be lanthanum in combination with bismuth.

As indicated above, element A' can be at least one element selected from monovalent alkali elements or divalent elements from the group comprising the alkaline-earths. More particularly, A can be selected from potassium, strontium and barium.

A' can also be tin, lead, samarium, europium, erbium, thulium or ytterbium, these elements being present in the divalent state.

Finally, A' can be selected from quadrivalent elements from the group comprising thorium, uranium, cerium, praseodymium, terbium and elements from group IVA, in particular zirconium and hafnium in the latter group.

B can be at least one hexavalent element selected from those in group VIA. In this case, in a particular embodiment of the invention, B can be molybdenum. In variations, B can be molybdenum in combination with tungsten or chromium, or both. B can also be selected from elements from group VIIA. More particularly, it can be manganese or rhenium. Further, B can be selected from elements from group VIII. In this case, it can be ruthenium, osmium or iridium. Finally, B can be selected from group VIB with the exception of oxygen. More particularly, sulphur can be cited as an element from this group and, in a specific variation, compounds in which B is a combination of sulphur and molybdenum.

B' is at least one element selected from lithium, sodium, magnesium, calcium, scandium, yttrium, the rare earths with atomic numbers 63 to 71, i.e., europium or lutetium. B' can also be selected from elements from groups IVA to IIB provided that this element or these elements have an oxidation number of less than 6. A more particular example of an element from these groups that can be cited is vanadium. Finally, B' can be selected from aluminium III, silicon IV, gallium III, germanium IV, indium III, tin IV, phosphorus V, antimony V and bismuth V.

In formula (1) above x, y and z satisfy the following equations:

$$0 \leq x < 2; \ 0 \leq y < 2; \ 0 \leq z \leq 3$$

It should be noted that the value of $\delta$ is such that it ensures electrostatic neutrality of the compound given the nature of the elements A, A', B, B', X and the values of x, y and z. The value of $\delta$ can be positive or negative.

More particularly, x can satisfy the equation $0 \leq x \leq 1$, in particular in the case in which A' is at least one mono- or divalent element with the exception of lead or tin. Still more particularly, the value of x can be in the range 0 to 0.6, limits included.

Further, the value of y can in particular be in the range 0 to 1.5, limits included.

The choice of elements A, A', B, B', X and the variation in the values of x, y and z are conditioned by the fact that the compound concerned must have a cubic or pseudo-cubic cationic $\beta$-SnO$_4$ type lattice.

The atomic ratio R defined as (A+A')/(B+B') can be 1 or it can vary about this value. Here again, the variation in the value of this ratio is with the proviso that the cationic lattice of the type defined above is retained, with a greater or lesser number of vacancies.

Compounds corresponding to particular embodiments of the invention are given below:

$La_{2-x}A'_xMo_{2-y}B'_yO_{9+\delta}$; $(La,Bi)_{2-x}A'_xMo_{2-y}B'_yO_{9+\delta}$
$La_{2-x}A'_xW_{2-y}B'_yO_{9+\delta}$; $(La,Bi)_{2-x}A'_xW_{2-y}B'_yO_{9+\delta}$
$La_{2-x}A'_x(Mo,S)_{2-y}B'_yO_{9+\delta}$; $La_{2-x}A'_x(Mo,Cr)_{2-y}B'_yO_{9+\delta}$
$La_{2-x}A'_x(Mo,W)_{2-y}B'_yO_{9+\delta}$
$(La,Bi)_{2-x}A'_x(Mo,S)_{2-y}B'_yO_{9+\delta}$; $(La,Bi)_{2-x}A'_x(Mo,Cr)_{2-y}B'_yO_{9+\delta}$;
$(La,Bi)_{2-x}A'_x(Mo,W)_{2-y}B'_yO_{9+\delta}$;
$La_{2-x}A'_xMo_{2-y}B'_yO_{9-z+\delta}F_z$; $(La,Bi)_{2-x}A'_xMo_{2-y}B'_yO_{9-z+\delta}F_z$
$La,Bi)_{2-x}A'_x(Mo,W)_{2-y}B'_yO_{9-z+\delta}F_z$;

in which compounds, A' and B' are as defined above and A' can more particularly be K$^+$, Sr$^{2+}$ and Ba$^{2+}$ and more particularly, B' can be V$^{5+}$; the ratio between La and Bi (atomic ratio Bi/(La+Bi)) can be up to 15%; and the ratios of S$^{6+}$, Cr$^{6+}$, W$^{6+}$ to Mo$^{6+}$, expressed in the same manner, can in particular be at least 50%.

The compounds of the invention can be prepared by different types of processes.

It is possible to use a process employing a solid-solid type reaction. In general, the starting solid reagents used are oxides or carbonates, in particular of alkalis and alkaline-earths, or sulphates. The reactants are mixed in stoichiometric proportions for the desired composition, then heated. Heating is carried out at a temperature and for a time that enables the desired composition, to be formed. Heating is generally carried out either in air or in a reducing atmosphere, or under a greater or lesser oxygen pressure. The calcining temperature can be at least 500° C., more particularly at least 700° C. and the time can be at least about ten hours.

It is possible to carry out a plurality of heating steps one after the other and to grind the product between the heating steps.

A further process can be envisaged. A mixture can be formed of salts of the constituent elements of the compound such as nitrates or chlorides, in an organic medium (for example an alcohol) or an aqueous medium, then precipitated out by adding a basic compound such as ammonia and/or by adding carbon dioxide. The precipitate obtained is optionally dried then calcined.

For compounds containing fluorine, the fluorine can be introduced by a solid, solid-gas or liquid route, for example in an HF medium.

The compounds obtained are normally in the form of a powder. They can be sintered if necessary. Sintering is carried out in a manner that is known per se. First, the compound is formed. This forming is carried out by pressing, for example uniaxial pressing, by calendering or by tape casting. For forming, a known type of binder can be used, such as polyvinyl alcohol, resins (Carbowax, for example), metallic stearates such as aluminium or zinc stearates, sugars, starches, alginates or polymethylphenylene. The formed part is then sintered, with or without pressure, employing a sufficient temperature and time with a suitable atmosphere to obtain the desired density.

The powder compositions can also be extruded in a variety of forms, for example as a monolith, honeycomb, or cylinder. They can be deposited in the form of layers onto substrates.

The structure of the compounds of the invention gives them ionic conductive properties, more particular anionic conductive properties. This property has been demonstrated in the parent compound of the compounds of the invention, i.e., La$_2$Mo$_2$O$_9$. For this reason, the invention also concerns the use of the compounds described above as ion conductors, and the parent compound cited above.

These compounds can be used in all applications in which this conductive property is employed. Applications of this type that can be mentioned are electrochemical filtration by porous filters, electrochemical treatments of gaseous effluents, heterogeneous catalysis, in particular to catalyse controlled oxidation (coupling oxidation of methane) and dehydrogenation catalysis. These compounds can also be used to prepare matrices for luminophores requiring materials that can evacuate charges, or for the preparation of products with luminescent properties for television screens. The thermochromic properties of the compounds can also be exploited.

The compounds of the invention can also be incorporated into oxygen probes, for example $\lambda$ probes to regulate exhaust gases, in NO$_x$ traps, in solid oxide fuel cells, in chemical membrane reactions, for example reactors for controlled oxidation of hydrocarbons, or in oxygen separation membranes. Thus, the invention concerns devices of the type defined above comprising a compound in accordance with the invention as an ion conductor.

Examples will now be given.

EXAMPLES

The compounds were prepared from simple oxides for W, Mo, Bi, V, La and Re, from carbonates for K, Sr and Ba and from lanthanum sulphate for sulphur. For chromium, La$_2$CrO$_6$ was used obtained from La$_2$O$_3$ and Cr$_2$O$_3$ in oxygen. For fluorine, lanthanum oxyfluoride was used. These starting reactants were mixed in suitable proportions.

The ground products were mixed in an agate mortar then placed in an alumina pot. It was initially heated for 12 hours at 500° C., then calcined at a temperature in the range 700° C. to 1100° C. depending on the case, for at least 12 hours. It was allowed to cool. The grinding and calcining cycle was repeated until a pure product was obtained. Calcining was carried out in air with the exception of products comprising chromium, rhenium or fluorine. In the case of chromium, calcining was carried out in a stream of oxygen (1 atmosphere) and for rhenium and fluorine, in a sealed platinum tube.

The compounds obtained in the form of a powder were then sintered as follows. The powder was mixed with a binder (Rhodoviol®). The paste obtained was dehydrated. The hardened paste was ground then pelletized by uniaxial pressing (1 to 2T/20 mm$^2$). The product was annealed at 400° C. then calcined at 700° C. to 1050° C. for 6 to 12 hours. It was cooled slowly. The sintered product was in the form of bars (5 mm diameter and about 5 to 7 mm long).

The conductivity was determined by complex impedance spectroscopy in the frequency range 0.1 Hz to 32 MHz using a Solartron SI 1260 analyser. The measurement was made on said bars, platinum electrodes having being vacuum deposited on their two flat surfaces. The measurement was made in dry air at a potential of 100 mV after thermal stabilization for one hour.

Values for the lattice parameter at ambient temperature and conductivities at 500° C. and 800° obtained for the products are given below.

| Examples | Synthesis calcining temperature on ° C. | Parameter, Å |
|---|---|---|
| $La_2Mo_2O_9$ | 850 | 7.150 (pseudo-cubic) |
| $La_2Mo_{1.6}S_{0.4}O_9$ | 800 | 7.146 (cubic) |
| $La_2Mo_{1.7}W_{0.3}O_9$ | 1000 | 7.152 (cubic) |
| $La_2MoWO_9$ | 1100 | 7.153 (cubic) |
| $La_2MoCrO_{9+\delta}$ | 700 | 7.132 (cubic) |
| $La_2Mo_{1.95}V_{0.05}O_{8.975}$ | 900 | 7.150 (cubic) |
| $La_2Mo_{1.9}Re_{0.1}O_{9+\delta}$ | 900 | 7.157 (cubic) |
| $La_{1.9}Bi_{0.1}Mo_2O_9$ | 850 | 7.164 (cubic) |
| $La_{1.7}Bi_{0.3}Mo_2O_9$ | 850 | 7.190 (cubic) |
| $La_{1.9}K_{0.1}Mo_2O_{8.9}$ | 960 | 7.172 (cubic) |
| $La_{1.9}Sr_{0.1}Mo_2O_{8.95}$ | 1050 | 7.168 (cubic) |
| $La_{1.8}Ba_{0.2}Mo_2O_{8.95}$ | 970 | |
| $La_2Mo_2O_{9-z/2}F_z$ ($z \leq 0.1$) | 900 | 7.167 (pseudo-cubic) |

| Examples | Conductivity, S. cm$^{-1}$ | |
|---|---|---|
| | at 500° C. | at 800° C. |
| $La_2Mo_2O_9$ | $4.64 \times 10^{-5}$ | $8.02 \times 10^{-2}$ |
| $La_2Mo_{1.6}S_{0.4}O_9$ | $1.01 \times 10^{-4}$ | $4.81 \times 10^{-2}$ |
| $La_2Mo_{1.7}W_{0.3}O_9$ | $1.77 \times 10^{-4}$ | $6.04 \times 10^{-2}$ |
| $La_2MoWO_9$ | $9.33 \times 10^{-6}$ | $4.21 \times 10^{-3}$ |
| $La_2MoCrO_9$ | $5.42 \times 10^{-4}$ | $9.98 \times 10^{-3}$ |
| $La_2Mo_{1.95}V_{0.05}O^9$ | $3.00 \times 10^{-5}$ | $5.2 \times 10^{-2}$ |
| $La_{1.9}Bi_{0.1}Mo_2O_9$ | $2.05 \times 10^{-4}$ | $6.96 \times 10^{-2}$ |
| $La_{1.7}Bi_{0.3}Mo_2O_9$ | $1.33 \times 10^{-4}$ | $2.22 \times 10^{-2}$ |
| $La_{1.9}K_{0.1}Mo_2O_{8.9}$ | $1.40 \times 10^{-5}$ | $5.65 \times 10^{-3}$ |
| $La_{1.9}Sr_{0.1}Mo_2O_{8.95}$ | $1.20 \times 10^{-5}$ | $6.03 \times 10^{-3}$ |
| $La_{1.8}Ba_{0.2}Mo_2O_{8.95}$ | $8.56 \times 10^{-6}$ | $2.74 \times 10^{-3}$ |

The invention claimed is:

1. A compound of formula (1):

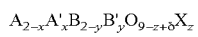

$$A_{2-x}A'_xB_{2-y}B'_yO_{9-z+\delta}X_z$$

wherein:

A is at least one trivalent rare earth, trivalent bismuth, trivalent antimony or trivalent arsenic;

A' is at least one alkali, alkaline-earth, tin, lead, samarium, europium, erbium, thulium, ytterbium, thorium, uranium, cerium, praseodymium or terbium element;

B is at least one hexavalent element selected from groups VIA, VIIA, VIII and VIB with the further proviso that B is not oxygen;

B' is at least one lithium, sodium, magnesium, calcium, scandium, yttrium element, a rare earth element with atomic numbers of 63 to 71, an element from groups IVA to IIB with an oxidation number of less than 6, aluminum III, silicon IV, gallium III, germanium IV, indium III, tin IV, phosphorus V, antimony V or bismuth V element; X is at least one sulfur, fluorine or chlorine anion; and x, y and z satisfy the following equations:

$$0 \leq x < 2;\ 0 \leq y < 2;\ 0 \leq z \leq 3$$

with the further proviso that, when A is lanthanum and B is tungsten or molybdenum, at least one of x, y or z is different from 0;

said compound having a cationic cubic or pseudo-cubic-$\beta$-$SnWO_4$ type lattice.

2. The compound according to claim 1, wherein A' is a mono- or divalent element with the further proviso that A' is not lead or tin and wherein x satisfies the equation: $0 \leq x \leq 1$.

3. The compound according to claim 1, wherein y satisfies the equation: $0 \leq y \leq 1.5$.

4. The compound according to claim 1, wherein A is a trivalent rare earth selected from the group consisting of lanthanum, cerium, praseodymium, neodymium, samarium, europium and gadolinium.

5. The compound according to claim 4, wherein A is lanthanum or neodymium.

6. The compound according to claim 1, wherein A is lanthanum in combination with bismuth.

7. The compound according to claim 1, wherein A' is potassium, strontium or barium.

8. The compound according to claim 1, wherein B is molybdenum.

9. The composition according to claim 8, wherein B is molybdenum, further in combination with tungsten or chromium.

10. The compound according to claim 1, wherein B' is vanadium.

11. The compound according to claim 8, wherein B' is sulphur.

12. An ion conductor, comprising the compound of formula (1) as defined in claim 1.

13. A device selected from the group consisting of an oxygen probe, fuel cell, chemical membrane reactor, oxygen separation membrane, electrochemical cell and $NO_x$ trap, comprising an ion conductor as defined in claim 12.

14. A device selected from the group consisting of an oxygen probe, fuel cell, chemical membrane reactor, oxygen separation membrane, electrochemical cell and $NO_x$ trap, comprising an ion conductor wherein the ion conductor is $La_2Mo_2O_9$.

* * * * *